(12) United States Patent
DeBates et al.

(10) Patent No.: US 10,108,272 B1
(45) Date of Patent: Oct. 23, 2018

(54) WEARABLE DEVICE WITH GESTURE RECOGNITION MODULE

(71) Applicant: Motorola Mobility LLC, Chicago, IL (US)

(72) Inventors: Scott Patrick DeBates, Crystal Lake, IL (US); Douglas Alfred Lautner, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/608,867

(22) Filed: May 30, 2017

(51) Int. Cl.
*H04B 7/00* (2006.01)
*G06F 3/01* (2006.01)
*G06F 1/16* (2006.01)
*G07C 9/00* (2006.01)
*G06K 19/04* (2006.01)

(52) U.S. Cl.
CPC .............. *G06F 3/017* (2013.01); *G06F 1/163* (2013.01); *G06K 19/045* (2013.01); *G07C 9/00658* (2013.01)

(58) Field of Classification Search
CPC ....... G06F 3/017; G06F 1/163; G06K 19/045; G07C 9/00658
See application file for complete search history.

(56) References Cited

U.S. PATENT DOCUMENTS

| | | | |
|---|---|---|---|
| 2016/0036965 A1* | 2/2016 | Kim | H04W 4/70 455/411 |
| 2016/0080154 A1* | 3/2016 | Lee | H04L 9/3234 713/185 |
| 2016/0154475 A1* | 6/2016 | Eriksson | G06F 3/017 345/156 |
| 2017/0177091 A1* | 6/2017 | Shah | G06F 3/017 |
| 2017/0192517 A1* | 7/2017 | Hygh | G06F 3/017 |

* cited by examiner

*Primary Examiner* — Xin Jia
(74) *Attorney, Agent, or Firm* — Wolfe-SBMC

(57) ABSTRACT

A system includes a wearable device including a gesture recognition module configured to detect a gesture using the gesture recognition module. A wireless device is configured to implement one or more functionality types. The wearable device can wirelessly detect the wireless device and obtain a code from the wireless device. The wearable device detects a gesture and in response, transmits the code to the wireless device to cause the wireless device to implement at least one of the one or more functionality types.

20 Claims, 6 Drawing Sheets

WEARABLE DEVICE WITH GESTURE RECOGNITION MODULE

BACKGROUND

Many types of devices require a user to physically engage the device in some manner in order to induce a state change in the device. For example, a lock on a secured door or cabinet can utilize a security device to unlock the secured door or cabinet. For example, a user may wear a security badge that communicates with the security device to allow access to and unlock the secured door or cabinet. Typically, the user may swipe the security badge proximate a badge reader to unlock the door. However, this technique to unlock the secured door or cabinet requires the user to perform additional inconvenient motions with the security badge. For example, if the user is not wearing the security badge, they may have to physically search their pockets or retrieve the security badge from their wallet. Then, the user must physically place the security badge in proximity of the badge reader. This can take additional time and, if the user is in a hurry, can slow the user down. Other types of devices require the same, similar or additional physical engagement to induce a state change in the device.

BRIEF DESCRIPTION OF THE DRAWINGS

Embodiments of wirelessly-induced state change using gestures are described with reference to the following Figures. The same numbers may be used throughout to reference like features and components that are shown in the Figures.

DETAILED DESCRIPTION

Overview

Various embodiments provide a wireless device that implements one or more functionality types, a wearable device including an RFID device, and a gesture recognition module that work together to implement the functionality or functionality types. Specifically, in at least some embodiments, the wearable device is configured to wirelessly detect the wireless device and obtain a code from the wireless device. The code is configured to be used to cause or otherwise induce a state change in the wireless device. Specifically, the wearable device is configured to detect a gesture using the gesture recognition module and, responsive to detecting the gesture, transmit the code via the RFID device effective to cause the wireless device to implement at least one of the functionality types, e.g., to cause the above-mentioned state change. The gesture is associated with the functionality type such that when the gesture is detected, the code is transmitted to induce the state change in the wireless device. This can relieve the user of having to physically engage the wireless device in order to change a state associated with the wireless device. Such a state change can pertain to any state change associated with the wireless device, such as an operational state.

In some embodiments, the wireless device is a secured object, such as a door, cabinet, or other lockable device that incorporates a security device, such as a lock, that allows or denies access to the secured object. A wearable device is configured to be worn by a user and can receive, via a wireless transceiver, an unlock passcode from the lock—in this case, a wireless lock device. The wearable device may then detect an unlock gesture performed by a user wearing the wearable device, and responsive to detecting the unlock gesture, transmit the unlock passcode to the wireless device to unlock the wireless device. So, in this instance, the functionality type pertains to locking/unlocking a wireless lock device, and the corresponding state change is one of transitioning from a locked state to an unlocked state, or from an unlocked state to a locked state. As noted above, this can, but need not necessarily, relieve the user of having to physically engage the wireless device in order to change a state associated with the wireless device.

While features and concepts of wirelessly-induced state change using gestures can be implemented in any number of different devices, systems, environments, and/or configurations, embodiments of wirelessly-induced state change using gestures are described in the context of the following example devices, systems, and methods.

Example Operating Environment

Figure 1:
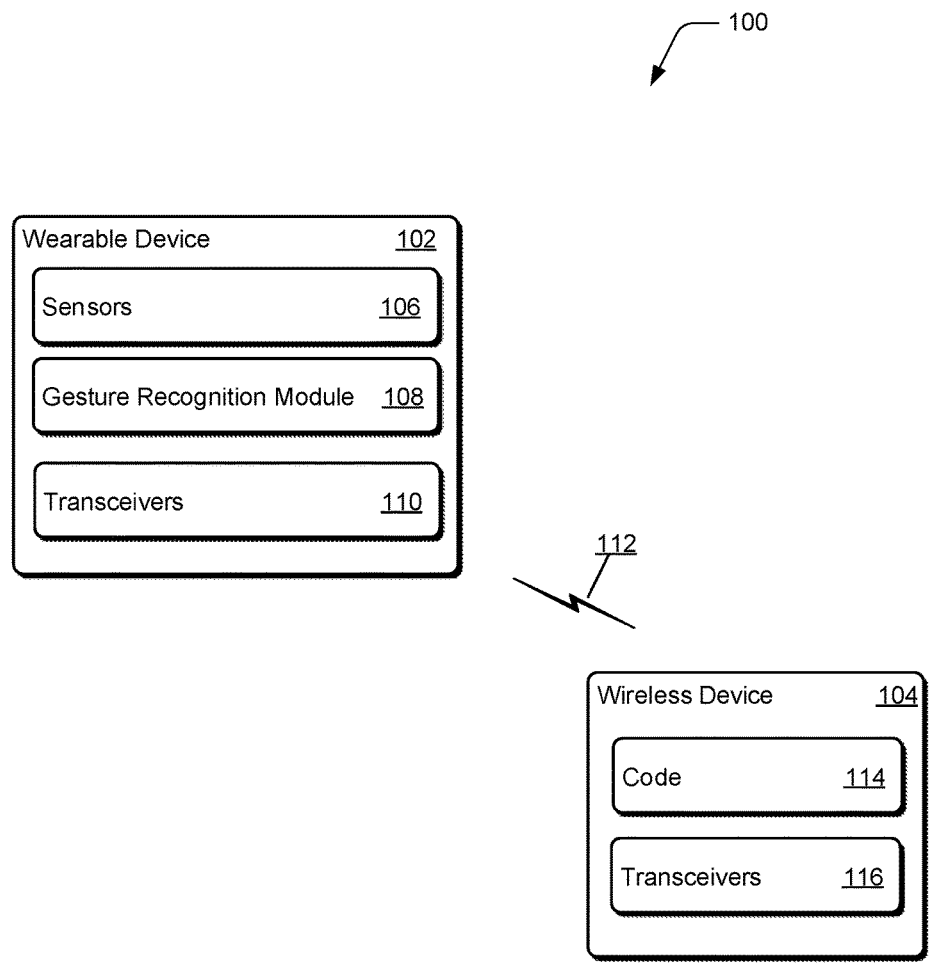
FIG. 1 illustrates an example operating environment that can induce a wireless state change using gestures in accordance with one or more embodiments.

FIG. 1 illustrates an example operating environment 100 in which embodiments for wirelessly-induced state change using gestures can be implemented. The example environment 100 includes a wearable device 102 and a wireless device 104. The wearable device 102 may be any type of device that includes sensors 106 that can be used for detecting motion. In this example, the wearable device 102 includes a gesture recognition module 108, which represents functionality that enables communication with the sensors 106 to detect whether a particular gesture is performed by a user wearing the wearing device, as further described herein. The sensors 106 can include, by way of example and not limitation, an accelerometer(s), gyroscope(s), force sensor(s), heat sensor(s), and any other sensor that can or might be used for gesture recognition. For discussion purposes, gesture recognition module 108 is illustrated as a single module, but it is to be appreciated that gesture recognition module 108 can be implemented using any suitable combination of hardware, software, and/or firmware. The wearable device 102 can also be implemented with additional, various components, such as a processing system and memory (not shown), and any number and combination of components as further described with reference to the example device shown in FIG. 6.

In this example environment 100, the wearable device 102 also includes one or more transceivers 110 that enable the wearable device 102 to wirelessly communicate 112 with the wireless device 104, as described below in more detail. The transceivers 110 can employ any suitable type of technology to enable communication with wireless device 104 including, by way of example and not limitation, Bluetooth, Wi-Fi, radio-frequency identification (RFID), cellular, near field communication (NFC), and the like.

The wireless device 104 includes, among other components, a code 114, such as an access code, and one or more transceivers 116. The code 114 can be saved on some type of computer-readable storage medium and used by the wireless device 104 to provide to the wearable device 102 to initiate various functionality that is performed by the wireless device 104 or a device communicatively coupled to the wireless device 104. That is, the code 114 can be transmitted from the wireless device 104 to the wearable device 102 and, once the gesture recognition module recognizes a particular gesture, the code 114 can be re-transmitted from the wearable device 102 to the wireless device 104 to serve as an authentication or verification that a functionality associated with that particular gesture and code is to be performed by the wireless device. The wireless device 104 can also be implemented with additional, various components, such as a processing system and memory (not shown), and any number and combination of components as further described with reference to the example device shown in FIG. 6.

As mentioned above, the transceivers 116 enable the wireless device 104 to wirelessly communicate 112 the code 114 to the wearable device 102. The transceivers 116 can employ any suitable type of technology to enable communication with the wearable device 102 including, by way of example and not limitation, Bluetooth, Wi-Fi, RFID, cellular, NFC, and the like.

In implementations, the wearable device 102 receives the code 114 from the wireless device 104 and stores the code 114 in memory, as described below in more detail. The code is associated with or otherwise "mapped" to a particular gesture and a functionality associated with the gesture that can be performed by the wireless device. When the gesture recognition module 108 detects the particular gesture performed by the user of the wearable device 102, the code 114 is transmitted or re-transmitted from the wearable device 102 back to the wireless device 104. By receiving the code 114 back from the wearable device 102, the wireless device now knows that it can perform the functionality that is associated with the code and the gesture.

In another example, the environment 100 includes a mobile device (not shown), the wearable device 102, and the wireless device 104. The mobile device may be any type of device that includes transceivers that can be used to communicate with the wearable device 102 and the wireless device 104. The transceivers of the mobile device can employ any suitable type of technology to enable communication with wireless device 104 including, by way of example and not limitation, Bluetooth, Wi-Fi, radio-frequency identification (RFID), cellular, near field communication (NFC), and the like. The mobile device can also be implemented with additional, various components, such as a processing system and memory (not shown), and any number and combination of components as further described with reference to the example device shown in FIG. 6.

The mobile device and the wearable device 102 can operate together to facilitate wirelessly-induced state change using gestures. In implementations, the mobile device receives the code 114 from the wireless device 104 and stores the code 114 in memory. When the gesture recognition module 108 of the wearable device 102 detects the particular gesture performed by the user of the wearable device 102, the mobile device receives an indication from the wearable device 102 that the particular gesture was performed and, in response to the indication, the code 114 is transmitted or re-transmitted from the mobile device back to the wireless device 104. By receiving the code 114 back from mobile device, the wireless device 104 can perform the functionality that is associated with the code and the gesture.

Having considered an example operating environment, consider now an example wearable device in accordance with one or more embodiments.

Example Wearable Device

Figure 2:
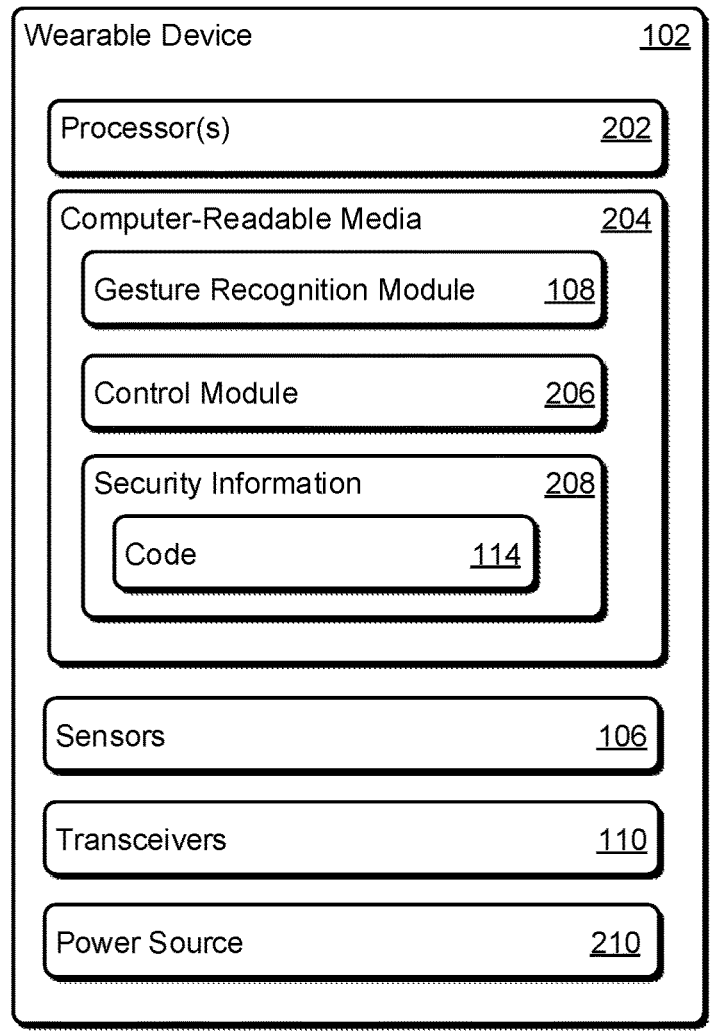
FIG. 2 illustrates an example wearable device in accordance with one or more embodiments.

FIG. 2 illustrates an expanded view of the wearable device 102 of FIG. 1. The wearable device 102 includes processor(s) 202 and computer-readable media 204. Applications and/or an operating system (not shown) embodied as computer-readable instructions on computer-readable media 204 can be executed by processor(s) 202 to provide some or all of the functionalities described herein. To facilitate wirelessly-induced state change using gestures, wearable device 102 includes gesture recognition module 108 and control module 206. Here, gesture recognition module 108 and control module 206 are stored on computer-readable media 204. However, while gesture recognition module 108 and control module 206 are illustrated here as residing on computer-readable media 204, the gesture recognition module 108 and the control module 206 can alternately or additionally be implemented using hardware, firmware, or any combination thereof.

As noted above, the gesture recognition module 108 represents functionality that enables communication with the sensors 106 to detect whether a particular gesture is performed by a user wearing the wearing device. So, for example, sensors 106 may sense motion of the user, and the motion may have a profile that is associated with a gesture. The motion may, for example, be characterized by movement in a first direction, followed by movement in a second direction, followed by yet another movement in a third different direction. These three movements can be sensed by the sensors 106 and then identified by the gesture recognition module 108 to be associated with a particular gesture.

The control module 206 represents functionality that enables control of the device components of the wearable device 102. For example, the control module 206 can be implemented to receive an indication from the gesture recognition module 108 that a particular gesture is performed by a user of the wearable device 102. The control module 206 can then direct the transceivers 110 to transmit security information 208, e.g., code 114, or other information stored in the computer-readable media 204 to a corresponding wireless device.

The control module 206 can also be implemented to obtain information from the wireless device. For example, the control module 204 can obtain information stored in wireless device 104 via transceivers 110. The information received is then stored on computer-readable media 204 and can be utilized by the gesture recognition module 108 and/or control module 206 as described above and below.

The security information 208 can include information or data associated with the wearable device 102 and/or the wireless device 104. Continuing with the example discussed above, the code 114 stored by wireless device 104 is transmitted to the wearable device 102, and stored or maintained as security information 208. Additionally, the security information 208 can include information associated with communicating with the wireless device 104, such as pairing information of the wearable device 102 and the wireless device 104, public/private encryption keys, user credentials, and the like.

The wearable device 102 also includes a power source 210, such as a battery, to power the various device components of the wearable device 102.

Having considered an example wearable device, consider now example gestures in an operating environment in accordance with one or more embodiments.

Example Gestures in an Operating Environment

Figure 3A:
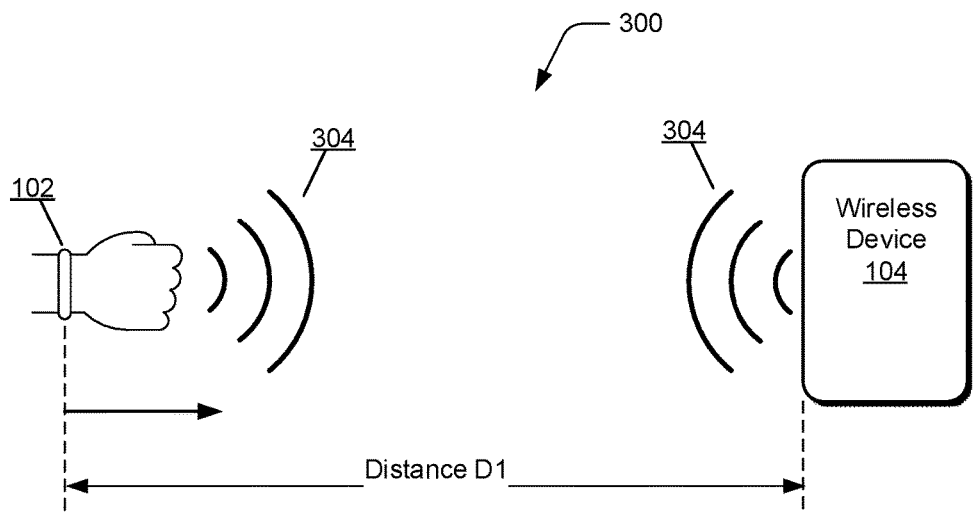
FIGS. 3a and 3b illustrate an example environment that includes an example implementation in accordance with one or more embodiments.
Figure 3B:
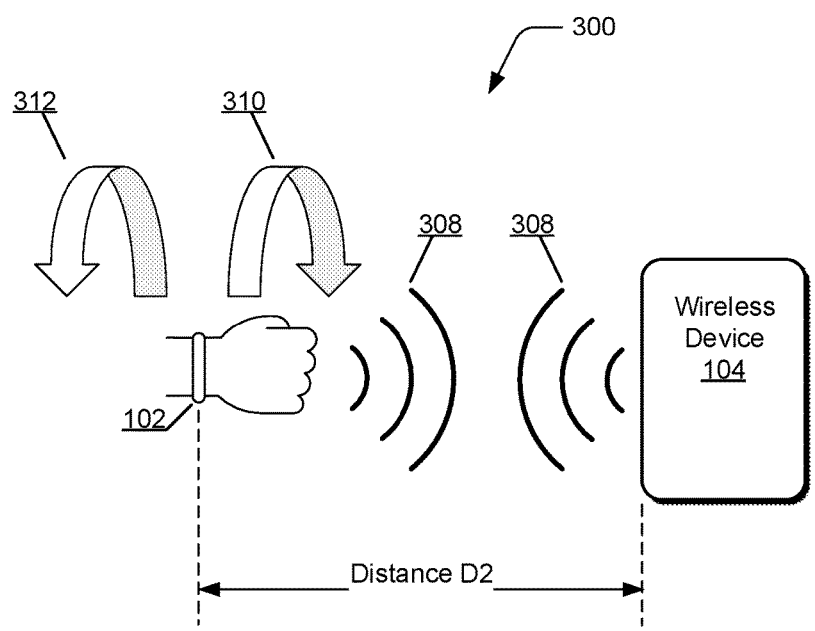

FIGS. 3a and 3b illustrate an example operating environment 300 in which embodiments for wirelessly-induced state change using gestures can be implemented. The example environment 300 includes a wearable device 102 (shown as a wristband) and the wireless device 104 from FIG. 1.

Consider FIG. 3a, which illustrates the wearable device 102 approaching the wireless device 104. The wearable device 102 is at a distance D1 away from the wireless device 104 such that the distance D1 is within a communication range 304 of the transceivers of both devices. The distance D1 is a first threshold distance for the wireless device 104 to communicate a code (e.g., code 114) to the wearable device 102. For example, the wearable device 102 and the wireless device 104 can each implement a Bluetooth transceiver that typically has a communication range of approximately 10 meters. When the wearable device 102 is within Bluetooth communication range, the wireless device 104 transmits the code 114 to the wearable device 102 via the Bluetooth transceiver. Additionally, the wireless device 104 can transmit additional information stored in memory of the wireless device 104 to the wearable device 102 when the code 114 is transmitted via Bluetooth. Alternatively, the wearable device 102 can transmit a request to the wireless device 104 to obtain the additional information via Bluetooth.

Alternatively, when the wearable device 102 is at or within the distance D1 away from the wireless device 104, the wireless device 104 can execute a pairing method to pair the devices for communication. Continuing with the example above, the wireless device 104 may determine that the wearable device 102 has not been previously paired via Bluetooth and can execute a pairing method to pair the devices. The pairing of the devices can be implemented using any suitable Bluetooth pairing method.

In FIG. 3b, the wearable device 102 is now at a distance D2 away from the wireless device 104 such that the distance D2 is within a different communication range. The communication range may or may not be one associated with another one of the transceivers of both devices. The distance D2 is a second threshold distance for the wearable device 102 to communicate the code back to the wireless device 104, where the distance D2 is less than the distance D1. For example, the wearable device 102 may include a passive RFID tag and the wireless device 104 may include an RFID reader. The RFID reader of the wireless device 104 is implemented to communicate with the RFID tag of the wearable device 102 via inductive coupling, typically having a communication range of approximately one meter. The inductive coupling allows the RFID reader of the wireless device 104 to power and communicate with the RFID tag of the wearable device 102.

Alternatively, the same type of transceiver can be implemented to communicate at the distance D1 and the distance D2. For example, Bluetooth transceivers can be implemented by each device to communicate at the distance D1 and the distance D2, or RFID transceivers can be implemented by each device to communicate at the distance D1 and the distance D2.

In one or more embodiments, after receiving the code from the wireless device 104, the user may execute a gesture and the wearable device 102 may determine that the particular gesture has been performed. For example, the wearable device 102 can determine that the user performed a clockwise twisting gesture 310 and a counter-clockwise gesture 312 via the sensors 106, while the wearable device 102 is within the distance D2. Responsive to determining that the user has performed the gesture, the wearable device 102 can then communicate the code received from the wireless device 104 back to the wireless device 104 via the RFID tag. The wireless device 104 receives the code from the wearable device 102 and, responsively, performs one or more functions associated with the code on either the wireless device 104 or a device communicatively coupled to the wireless device 104.

It should be noted that the wearable device can be a device embedded into an article of clothing, such as a sleeve or cuff of a shirt or jacket, rather than a wristband as described above. In another example, a mobile device (not shown) can be utilized with a wearable device embedded in an article of clothing for wirelessly-induced state change using gestures. In one or more embodiments, the mobile device and the wireless device 104 can each implement a Bluetooth transceiver, and when the mobile device is at the distance D1 away from the wireless device 104, the wireless device 104 communicates the code to the mobile device via the Bluetooth transceiver. Additionally, the wireless device 104 can transmit additional information stored in memory of the wireless device to the mobile device when the code is transmitted. Alternatively, the mobile device can transmit a request to the wireless device 104 to obtain the additional information.

In one or more embodiments, the wearable device may include a passive RFID tag, and the mobile device and the wireless device 104 may each include an RFID reader. The RFID reader of the mobile device is implemented to communicate with the RFID tag of the wearable device and communicate with the RFID reader of the wireless device 104.

When the mobile device and the wearable device are at the distance D2 away from the wireless device 104, the user may execute the gesture and the wearable device may determine that the particular gesture has been performed. The wearable device can then communicate an indication to the mobile device that the user has performed the gesture via the RFID tag. Responsive to receiving the indication, the mobile device can then communicate the code received from the wireless device 104 back to the wireless device 104 via the RFID reader. The wireless device 104 receives the code from the mobile device and, responsively, performs one or more functions associated with the code on either the wireless device 104 or a device communicatively coupled to the wireless device 104.

Figure 4:
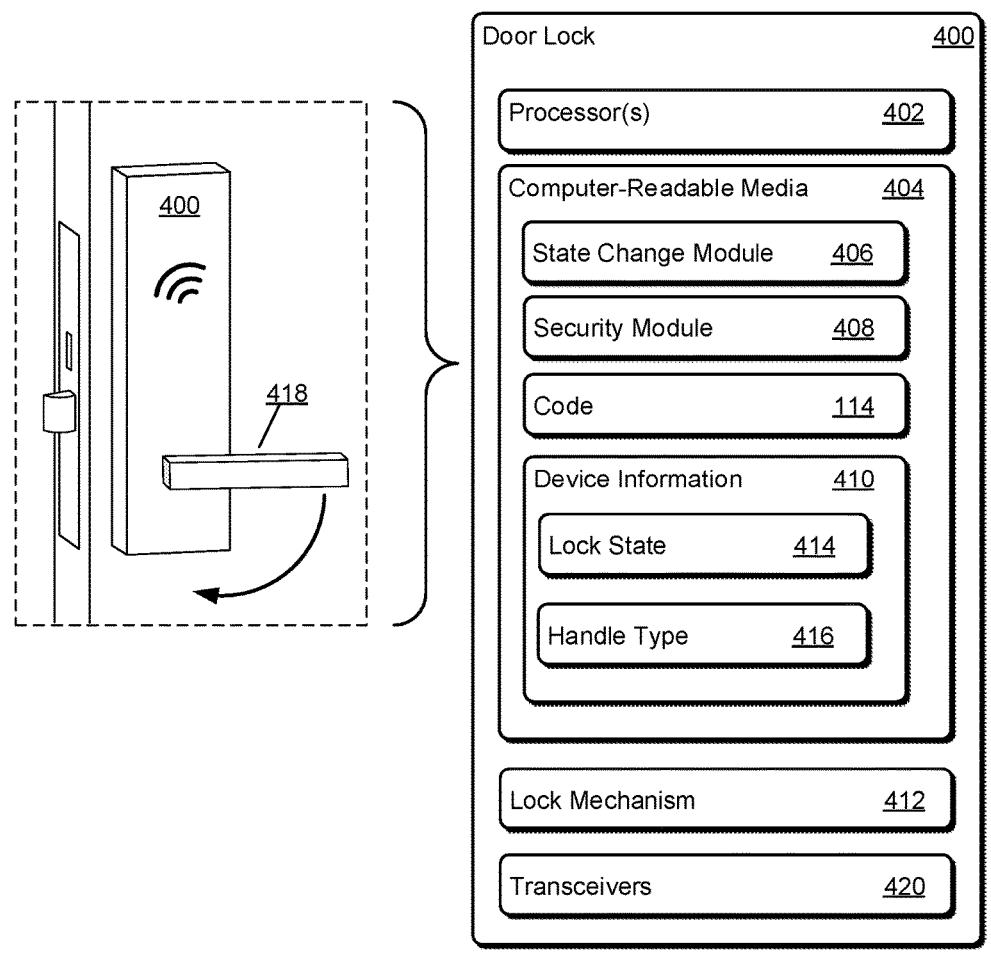
FIG. 4 illustrates an example door lock in accordance with one or more embodiments.

As noted above, the wireless device 104 can be any suitable type of wireless device. In one or more implementations, the wireless device 104 is a door lock that unlocks or locks based on the gesture performed by the user. One such wireless device in the form of a door lock is shown in FIG. 4.

There, an example door lock 400 includes processor(s) 402 and computer-readable media 404. Applications and/or an operating system (not shown) embodied as computer-readable instructions on computer-readable media 404 can be executed by processor(s) 402 to provide some or all of the functionalities described herein. To facilitate wirelessly-induced state change using gestures, the computer-readable media 404 of the door lock 400 includes state change module 406 and security module 408. Here, state change module 406 and security module 408 are stored on computer-readable media 404. However, while state change module 406 and security module 408 are illustrated here as residing on computer-readable media 404, state change module 406 and security module 408 can alternately or additionally be implemented using hardware, firmware, or any combination thereof.

In one or more embodiments, the security module 408 represents functionality that generates and/or otherwise stores codes or passcodes in computer-readable media 404. Alternatively, the state change module 406 or another module (not shown) can be implemented to generate the code 114. The security module 408 can also be implemented to generate a new code after each use of the code 114. For example, after the security module 408 validates a received code from the wearable device, the security module 408 may generate a new code to unlock/lock the door lock 400 and store the new code as code 114.

In one or more embodiments, the security module 408 can be implemented to generate multiple different codes, where each code corresponds to a particular functionality of the door lock 400. For example, the security module 408 generates an unlock code and a lock code that are transmitted to the wearable device. If a user of the wearable device performs a gesture associated with the unlock functionality of the door lock 400 (e.g., FIG. 3 element 310), then the door lock 400 receives the unlock code from the wearable device. Likewise, if the user of the wearable device performs another gesture associated with the lock functionality of the door lock 400 (e.g., FIG. 3 element 312), then the door lock 400 receives the lock code from the wearable device. Additionally, responsive to receiving the unlock code or the lock code from the wearable device, the security module 408 generates and stores a new unlock code or a new lock code.

In one or more embodiments, the security module 408 can also be implemented to execute a pairing method to pair the door lock 400 to devices for communication. For example, the security module 408 generates encryption keys to enable secure communication between the door lock 400 and the wearable device 102. The encryption keys include public/private keys or any suitable encryption keys conforming to a particular wireless specification (e.g., Bluetooth specification v1.1 or newer). Alternatively, one of the transceivers 420 generates the encryption keys to enable secure communication between the door lock 400 and the wearable device 102, and the security module 408 obtains the encryption keys from the one transceiver to store in computer-readable media 404.

The state change module 406 can be implemented to store information in the computer-readable media 404 as device information 410. For example, the state change module 406 is communicatively coupled to lock mechanism 412 of the door lock 400 and can store information indicating a status of the lock mechanism 412 as lock state 414. The lock state 414 indicates whether the lock mechanism 412 of the door lock 400 is locked or unlocked. For example, the door lock 400 receives and authenticates the code 114 from the wearable device, and based on the lock state 414 that indicates the lock mechanism 412 is locked, the state change module directs the lock mechanism 412 to unlock and updates the lock state 414. Alternatively, if the current lock state 414 indicates that the lock mechanism 412 is unlocked, then the state change module directs the lock mechanism 412 to lock in response to receiving and authenticating the code 114 from the wearable device.

The device information 410 can also include a handle type 416 that indicates a type of handle associated with handle 418 of the door lock 400. It should be noted that the handle 418 and the locked mechanism 412 are separated in function. For example, if the lock mechanism 412 is locked, and a user tries to open the door using the handle 418, then the door does not open even though the user is able to turn the handle 418. The function of the door unlocking is controlled by the lock mechanism 412 of the door lock 400.

As illustrated, the handle 418 is a lever type handle that requires a downward clockwise rotation to open the door. Other types of handles for the door lock 400 can be implemented. For example, rather than the handle 418 being a lever type handle as illustrated, the handle 418 can be a knob type handle and the handle type 416 indicates that the handle 418 is a knob type handle. In another example, the door lock 400 is implemented on a powered sliding door that has no handle, and the handle type can indicate that the door lock 400 has no handle.

The lock state 414 and/or handle type 416 can be provided to the wearable device. For example, the door lock 400 transmits the code 114 along with the lock state 414 and/or handle type 416 via transceivers 420 to the wearable device 102 via Bluetooth when the wearable device 102 is within Bluetooth communication range (e.g., distance D1) of the door lock 400. Alternatively, lock state 414 and/or the handle type 416 can be transmitted to the wearable device during the pairing process between the wearable device and the door lock 400, or as an additional communication transaction.

In one or more embodiments, the wearable device 102 can be implemented to utilize the information received from the door lock 400 as a basis to determine which gestures performed by a user of the wearable device 102 cause the wearable device 102 to transmit the code 114 back to the door lock 400. In other words, a particular gesture performed by the user acts as a trigger event for the wearable device 102 to transmit the code 114 to the door lock 400. For example, the information received from the door lock 400 may indicate that the handle type 416 associated with the door lock 400 is a lever. This information can be mapped to a gesture type that is associated with unlocking the door. That is, the wearable device 102 can utilize the handle type 416 as a basis for determining a particular gesture that causes the wearable device 102 to transmit the code 114 back to the wireless device 102 to unlock the door lock. In this particular example, the wearable device 102 may determine that a downward rotating motion is a typical motion to open a door with a lever handle. When a user of the wearable device 102 performs the downward rotating motion, the wearable device 102 detects the downward rotating motion and, as a result, transmits the code 114 back to the door lock 400 to unlock the door lock. The door lock 400 verifies the code received from the wearable device 102 against the generated and/or stored code. If the code received is validated and matches, then the door lock 400 unlocks the door. If the code is not validated, then the door lock 400 remains locked. Thus, the user can, in many instances, cause the door to be unlocked before they are in physical contact with the door.

In another example, the information received from the door lock 400 may indicate that the handle type 416 associated with the door lock is a knob. The wearable device 102 may then determine that a twisting motion is the typical motion to open a door with a knob handle. When a user of the wearable device 102 performs the twisting motion, the wearable device 102 detects the twisting motion and transmits the code 114 back to the door lock 400 to unlock the door lock.

In yet another example, the door lock 400 might be implemented on a sliding door and the information received from the door lock indicates that a handle type associated with the door lock is a sliding door handle or no handle at all. The wearable device 102 may then determine that a horizontal swipe motion of the user's hand will cause the code 114 to be transmitted to the door lock 400. When a user of the wearable device 102 performs the horizontal swipe motion, the wearable device 102 detects the horizontal swipe motion and transmits the code 114 back to the door lock 400 to unlock the door lock.

In one or more embodiments, the user can physically interact with the handle 418 of the door lock 400 and perform a motion on the handle that would typically open the door if the door was not locked. The wearable device 102 can detect this motion on the handle, and can determine that the motion performed by the user is the gesture to unlock the door lock. Hence, the gesture can be employed to unlock the door when the user physical interacts with the door handle. Alternatively, the user can perform the same gesture in the air without any interaction with the handle, and the wearable device 102 can detect the same motion and cause the door to be unlocked.

In implementations, the door lock 400 may be configured to open or close a door. The door lock 400 can be communicatively coupled to a device that controls opening and closing the door. For example, after unlocking the door lock in response to receiving a valid code from the wearable device 102, the door lock can communicate with the device that controls the door to open the door.

As noted above, the wireless device can comprise any suitable type of wireless device that can perform a functionality responsive to receive a re-transmitted code from a wearable device. For example, the wireless device 104 may be an ignition device of a vehicle that starts or stops the engine of the vehicle. The ignition device can generate and/or store a code in memory that can be utilized by the wearable device 102 to start/stop the vehicle. Additionally, the ignition device can store information in memory that includes an ignition state and an ignition type associated with the ignition device. For example, the ignition device can communicate the code and/or information to the wearable device 102 via Bluetooth when the wearable device 102 is within Bluetooth communication range (e.g., distance D1) of the ignition device. The wearable device 102 can utilize the information received from the ignition device as a basis for determining which gestures performed by the user of the wearable device 102 causes the wearable device 102 to transmit the code back to the ignition device. As the wearable device 102 moves closer to the ignition device, the user can perform a clockwise twisting gesture 310 or another suitable gesture while the wearable device 102 is within RFID communication range (e.g., distance D2). The wearable device 102 can determine that the gesture performed by the user is an appropriate gesture to start the vehicle based on the information received from the ignition device. In response to the user performing the clockwise twisting gesture 310, the wearable device 102 can transmit the code back to the ignition device to start the vehicle. The ignition device can verify the code received from the wearable device 102 against the generated/stored code. If the code received is validated and matches, then the ignition device can start the vehicle. If the code is not validated, then the ignition device does not start the vehicle.

Having considered an example gestures and operating environments in accordance with one or more embodiments, consider now an example wireless device that can be employed in connection with the above-described embodiments.

Example Techniques for Wirelessly-Induced State Change Using Gestures

Figure 5:
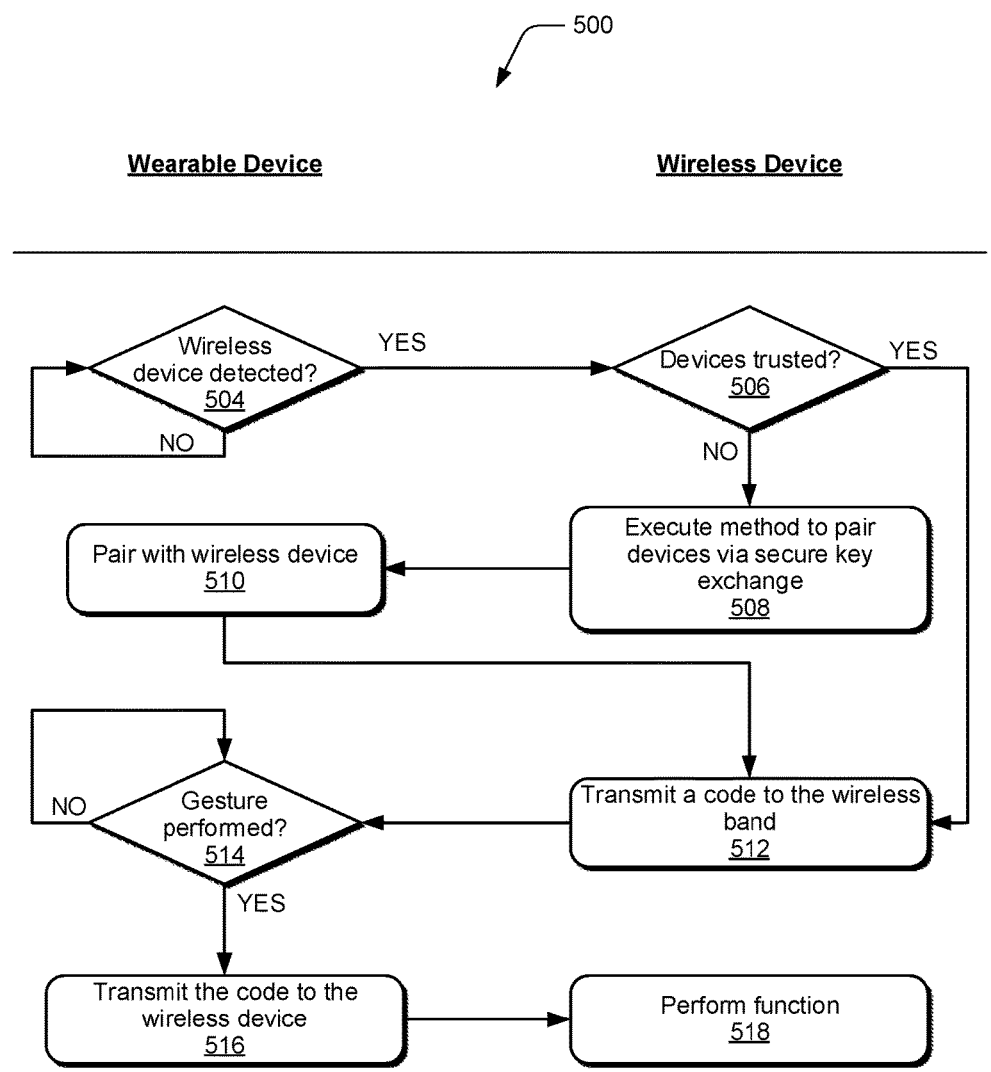
FIG. 5 illustrates a flow diagram that describes operations in accordance with one or more embodiments.

FIG. 5 illustrates an example method 500 of wirelessly-induced state change using gestures in accordance with one or more embodiments. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the method is described is not intended to be construed as a limitation, and any number or combination of the described method operations can be performed in any order to perform a method, or an alternate method. In the illustrated diagram, operations that are performed by a wearable device are designated "wearable device" and operations that are performed by a wireless device are designated "wireless device".

The operations assume that a user is wearing a wearable device, such as that described above. At 504, a determination is made by the wearable device as to whether a wireless device, such as wireless device 104 (above) is detected. The wireless device 104 can be detected in any suitable way. For example, various different technologies can be employed to detect the wireless device 104 including, by way of example and not limitation, Bluetooth, Wi-Fi, RFID, cellular, NFC, and the like. If the wireless device 104 is not detected (i.e. the "No" branch), the operations return to 504 and the wearable device continues scanning for a wireless device. In an alternative example, at 504, a mobile device communicatively coupled to the wearable device determines whether the wireless device is detected.

When a wireless device is detected at 504 (i.e., the "Yes" branch from 504), then at 506, a determination is made by the wireless device as to whether a trust relationship exists with the wearable device or whether the devices have been previously paired. If the wearable device is not trusted (i.e., the "No" branch from 506), then at 508, the wireless device executes a method to pair the devices. The pairing can include a secure key exchange between the devices to allow for secure communication (e.g., encrypted communication) between the devices. So, in this instance, the wireless device and the wearable device may exchange public keys so that transmissions from each device that are encrypted with the other's public key, can only be decrypted with the other's corresponding private key. At 510, the wearable device 102 pairs with the wireless device 104 or otherwise establishes a trust relationship. Continuing with the alternative example above, at 506, a determination is made by the wireless device as to whether a trust relationship exists with the mobile device or whether the devices have been previously paired. The wireless device and the mobile device may exchange public keys so that transmissions from each device that are encrypted with the other's public key, can only be decrypted with the other's corresponding private key. At 510, the mobile device pairs with the wireless device 104 or otherwise establishes a trust relationship.

If the wearable device is trusted (i.e., the "Yes" branch from 506) or after the pairing of the wearable device and the wireless device at 510, then at 512, a code (e.g., code 114) is transmitted from the wireless device to the wearable device. For example, code 114 transmitted from the wireless device to the wearable device is stored on the wearable device as security information 208. Continuing with the alternative example above, if the mobile device is trusted or after the pairing of the mobile device and the wireless device, then at 512, a code (e.g., code 114) is transmitted from the wireless device to the mobile device.

At 514, after the code has been received or otherwise stored, a determination is made as to whether a gesture is performed. The gesture being performed can be determined in any suitable way. For example, various different technologies (i.e. sensors) can be employed to detect motion, position, acceleration, directional changes, and the like, of the wearable device including, by way of example and not limitation, an accelerometer, a gyroscope, and the like.

If the gesture is not performed by the user of the wearable device (i.e., the "No" branch from 514), the wearable device continues to determine whether the gesture is performed by the user or simply waits for the gesture to be performed. Although, not illustrated, there may be a condition in which the wearable device loops through the process at 514 and the user moves outside of the detection range of the wireless device. To resolve this condition, the method can be implemented to restart at 504.

If the gesture is performed (i.e., the "Yes" branch from 514), then at 516, the wearable device 102 transmits the code received at 512 back to the wireless device. Continuing with the alternative example above, if the gesture is performed, then at 516, the wearable device 102 transmits an indication to the mobile device that the gesture is performed. The mobile device then transmits the code back to the wireless device in response to the indication from the wearable device.

At 518, the wireless device receives the re-transmitted code and, in response to receiving the code, performs one or more functions. The wireless device can be implemented to perform one or more functions associated with the wireless device itself, or associated with a device that is communicatively coupled to the wireless device.

Having considered an example method in accordance with one or more embodiments, consider now example gestures and operating environment that can be employed in connection with the above-described embodiments.

Example Device

Figure 6:
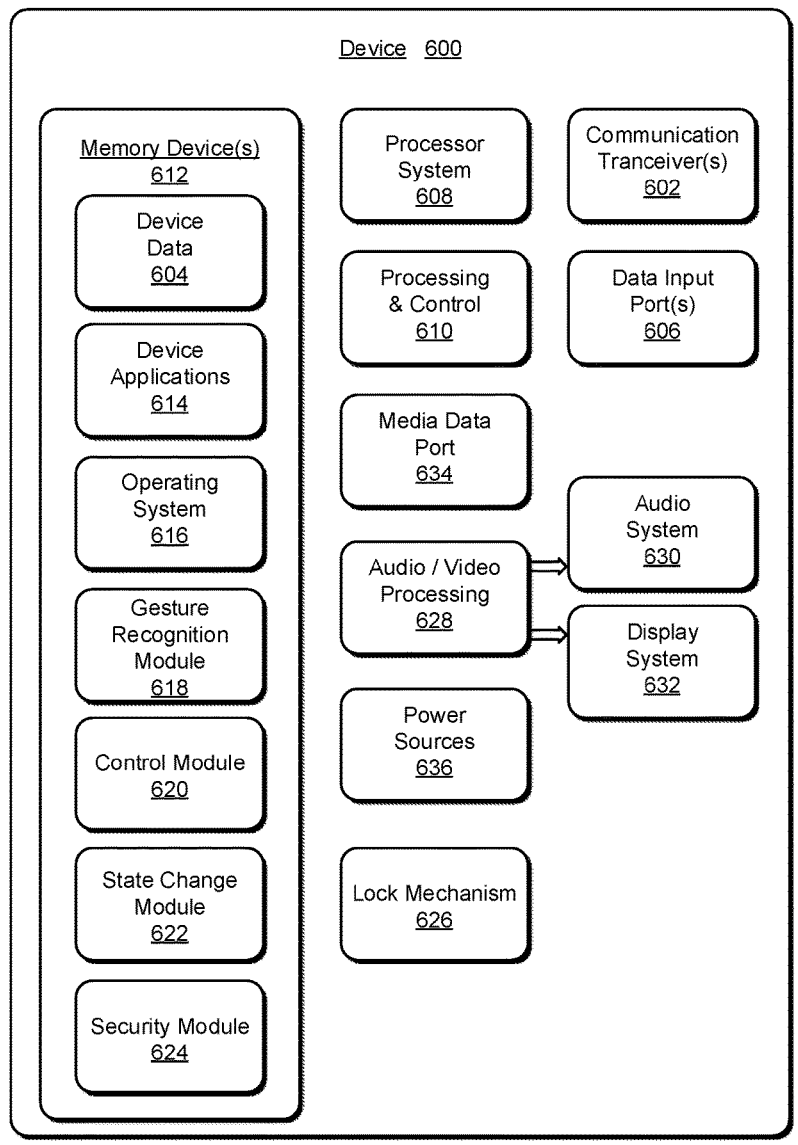
FIG. 6 illustrates various components of an example device that can implement embodiments of the wirelessly-induced state change using gestures.

FIG. 6 illustrates various components of an example device 600 in which embodiments of wirelessly-induced state change using gestures can be implemented. The example device 600 can be implemented as any of the computing devices described with reference to the previous FIGS. 1-5, such as any type of client device, mobile phone, tablet, computing, communication, entertainment, gaming, media playback, and/or other type of device. For example, the wearable device 102 and/or wireless device 104 shown in FIG. 1 may be implemented as the example device 600.

The device 600 includes communication transceivers 602 that enable wired and/or wireless communication of device data 604 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 600 may also include one or more data input ports 606 via which any type of data, media content, and/or inputs can be received, such as user selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory or memory devices 612 that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read only memory (ROM), flash memory, and other types of storage media in various memory device configurations. The device 600 may also include a mass storage media device.

The computer-readable storage memory provides data storage mechanisms to store the device data 604, other types of information and/or data, and various device applications 614 (e.g., software applications). For example, an operating system 616 can be maintained as software instructions with a memory device and executed by the processing system 608. The device applications may also include a device manager, such as any form of a control application, software application, signal-processing and control module, code that is native to a particular device, a hardware abstraction layer for a particular device, and so on. In this example, the device 600 includes a gesture recognition module 618, a control module 620, a state change module 622, and/or security module 624 that implement embodiments of wirelessly-induced state change using gestures as described above, and may be implemented with hardware components and/or in software, such as when the device 600 is implemented as the wearable device 102 and/or wireless device 104 described with reference to FIG. 1. An example of the gesture recognition module 618 is the gesture recognition module 108 and an example of the control module 620 is the control module 206 that is implemented by the wearable device 102. An example of the state change module 622 is the state change module 406 and an example of the security module 624 is the security module 408 that is implemented by the wireless device 104 or door lock 400.

The device 600 also includes a lock mechanism 626, such as described with reference to the lock mechanism 412 that is implemented in the door lock 400.

The device 600 also includes an audio and/or video processing system 628 that generates audio data for an audio system 630 and/or generates display data for a display system 632. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 634. In implementations, the audio system and/or the display system are integrated components of the example device. Alternatively, the audio system and/or the display system are external, peripheral components to the example device.

The device 600 can also include one or more power sources 636, such as when the device is implemented as a mobile device. The power sources may include a charging and/or power system, and can be implemented as a flexible strip battery, a rechargeable battery, a charged super-capacitor, and/or any other type of active or passive power source.

Although wirelessly-induced state change using gestures embodiments have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method implemented in a wearable device, the method comprising:
   receiving, via a wireless transceiver on the wearable device, information including:
   an unlock passcode from a wireless lock device;
   a handle type associated with the wireless lock device; and
   a lock status indicating whether the wireless lock device is locked or unlocked;
   detecting, by one or more sensors on the wearable device, an unlock gesture performed by a user wearing the wearable device;
   determining, based on the handle type, a particular unlock gesture performed by the user of the wearable device; and
   responsive to determining the particular unlock gesture and receiving the lock status, transmitting, via the wireless transceiver, the unlock passcode to the wireless lock device to unlock the wireless lock device and update the lock status.

2. The method as recited in claim 1, further comprising:
   detecting, via the wireless transceiver, the wireless lock device; and
   responsive to the wireless lock device and the wearable device having not been previously paired, pairing the wearable device with the wireless lock device.

3. The method as recited in claim 1, wherein the receiving the unlock passcode comprises receiving the unlock passcode in response to determining that the wireless lock device and the wearable device have been previously paired.

4. The method as recited in claim 1, wherein the wearable device comprises a wristband.

5. The method as recited in claim 1, wherein the unlock gesture comprises a handle turning motion.

6. The method as recited in claim 1, wherein the wireless transceiver is embodied on an RFID device.

7. The method as recited in claim 1, wherein:
   the wearable device comprises a wristband;
   the unlock gesture comprises a door handle turning motion; and
   the wireless transceiver is embodied on an RFID device.

8. The method implemented in a wearable device as recited in claim 1, wherein a new unlock passcode is generated after each use and stored at the wireless lock device.

9. A wearable device, comprising:
   one or more sensors configured to detect movement of the wearable device;
   a wireless transceiver configured to communicate with a wireless lock device;
   a processing system to interface with the one or more sensors and the wireless transceiver via a communication bus, the processing system being configured to:
   receive, via the wireless transceiver on the wearable device, information including:
   an unlock passcode from the wireless lock device;
   a handle type associated with the wireless lock device; and
   a lock status indicating whether the wireless lock device is locked or unlocked;
   detect, via the one or more sensors, an unlock gesture performed by a user wearing the wearable device;
   determine, based on the handle type, a particular unlock gesture performed by the user of the wearable device; and
   responsive to determining the particular unlock gesture, transmit, via the wireless transceiver, the unlock passcode to the wireless lock device to unlock the wireless lock device and update the lock status.

10. The wearable device as recited in claim 9, wherein the processing system is further configured to:
    detect, via the wireless transceiver, the wireless lock device; and
    responsive to the wireless lock device and the wearable device having not been previously paired, pair the wearable device with the wireless lock device.

11. The wearable device as recited in claim 9, wherein to receive the unlock passcode is to receive the unlock passcode in response to the wireless lock device and the wearable device having been previously paired.

12. The wearable device as recited in claim 9, wherein the wearable device comprises a wristband.

13. The wearable device as recited in claim 9, wherein the unlock gesture comprises a handle turning motion.

14. The wearable device as recited in claim 9, wherein:
the wearable device comprises a wristband;
the unlock gesture comprises a door handle turning motion; and
the wireless transceiver is embodied on an RFID device.

15. A system, comprising:
a wearable device including a gesture recognition module configured to detect a particular gesture using the gesture recognition module;
a wireless device that implements one or more functionality types;
a mobile device including an RFID device and configured to:
wirelessly detect the wireless device;
obtain a code from the wireless device;
obtain a handle type associate with the wireless device;
receive an indication, based on handle type, that the particular gesture is detected from the wearable device; and
responsive to the indication that the particular gesture is detected, transmit the code via the RFID device effective to cause the wireless device to implement at least one of the one or more functionality types.

16. The system as recited in claim 15, wherein said one of the one or more functionality types comprises an unlocking functionality.

17. The system as recited in claim 15, wherein the wearable device is embedded in an article of clothing.

18. The system as recited in claim 15, wherein the gesture comprises a twisting gesture.

19. The system as recited in claim 15, wherein said one of the one or more functionality types comprises an unlocking functionality, the gesture comprises a twisting gesture, and the wearable device comprises a wristband.

20. The system comprising the mobile device as recited in claim 15, further comprising a security module configured to generate a new unlock passcode after each use of the unlock passcode and store the new unlock passcode on the mobile device.

\* \* \* \* \*